US009457874B2

(12) United States Patent
Jacobsen et al.

(10) Patent No.: US 9,457,874 B2
(45) Date of Patent: Oct. 4, 2016

(54) HANDLING LOADS IN OFFSHORE ENVIRONMENTS

(71) Applicant: Subsea 7 Norway AS, Stavanger (NO)

(72) Inventors: Tore Jacobsen, Stavanger (NO); Arun Prahash Kalyana Sundaram, Hafrsfjord (NO); Jarle Havn, Stavanger (NO); Andrew Lewis, Rumbling Bridge (GB); Sigbjorn Daasvatn, Hornnes (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 14/403,190

(22) PCT Filed: May 23, 2013

(86) PCT No.: PCT/EP2013/060644
§ 371 (c)(1),
(2) Date: Nov. 23, 2014

(87) PCT Pub. No.: WO2013/174935
PCT Pub. Date: Nov. 28, 2013

(65) Prior Publication Data

US 2015/0110582 A1 Apr. 23, 2015

(30) Foreign Application Priority Data

May 24, 2012 (GB) .................................. 1209131.0
Sep. 14, 2012 (GB) .................................. 1216458.8

(51) Int. Cl.
*B63B 27/00* (2006.01)
*B63B 27/10* (2006.01)
(Continued)

(52) U.S. Cl.
CPC ............... *B63B 27/10* (2013.01); *B66C 13/02* (2013.01); *B66C 13/06* (2013.01); *Y10T 29/49826* (2015.01)

(58) Field of Classification Search
CPC ....... B66C 13/02; B66C 13/06; B66C 23/52; B66C 23/60; B63B 27/10; B63B 27/16; B63B 27/18; E02B 17/10; E04H 12/00; E04H 12/18
USPC ......... 414/141.6, 137.7, 137.9, 138.4, 142.6, 414/142.7, 142.8; 405/2; 212/270, 272, 212/273, 307–311; 114/366, 373, 376, 377; 52/651.05
See application file for complete search history.

(56) References Cited

U.S. PATENT DOCUMENTS 2,187,714 A 1/1940 Woodeson et al.
2,805,781 A 9/1957 Senn
(Continued)

FOREIGN PATENT DOCUMENTS

BE 832525 12/1975
DE 644 100 4/1937
(Continued)

*Primary Examiner* — Michael McCullough
*Assistant Examiner* — Lynn Schwenning
(74) *Attorney, Agent, or Firm* — Levy & Grandinetti

(57) ABSTRACT

A method of overboarding and lowering a load from a vessel is disclosed. The method uses a vessel-mounted crane to lift the load from a deck of the vessel, to move the load off the deck into an outboard over-water position, and to lower the load from the outboard position into the water. The method further includes placing at least one guide member acting in compression between the load and an upstanding supporting structure of the crane to restrain horizontal movement of the load relative to a boom of the crane. Then, lowering the guide member occurs to continue restraining horizontal movement of the load while lowering the load from the outboard position into the water. A related guide apparatus includes at least one guide member that is movably connected to a mount for movement relative to the mount around and parallel to a slewing axis of the crane.

37 Claims, 12 Drawing Sheets

(51) Int. Cl.
*B66C 13/02* (2006.01)
*B66C 13/06* (2006.01)

(56) References Cited

U.S. PATENT DOCUMENTS

| | | | | | |
|---|---|---|---|---|---|
| 3,168,955 | A * | 2/1965 | Black | B63B 27/36<br>114/366 |
| 3,480,157 | A | 11/1969 | Southerland et al. | |
| 3,814,264 | A * | 6/1974 | Frick | B66C 23/525<br>212/233 |
| 3,831,770 | A | 8/1974 | Gottlieb et al. | |
| 3,850,306 | A | 11/1974 | Mundy | |
| 3,993,011 | A * | 11/1976 | Garland | B63B 27/36<br>114/210 |
| 4,310,277 | A | 1/1982 | Robinson | |
| 4,364,326 | A * | 12/1982 | Pike | B63B 23/62<br>114/366 |
| 6,491,174 | B1 * | 12/2002 | Day | B66C 23/52<br>212/179 |
| 2009/0199757 | A1 | 8/2009 | Roodenburg et al. | |
| 2009/0261052 | A1 | 10/2009 | Vasstrand | |
| 2010/0135797 | A1 * | 6/2010 | Nies | F03D 1/003<br>416/9 |
| 2011/0056168 | A1 * | 3/2011 | Springett | B63B 27/16<br>52/745.18 |

FOREIGN PATENT DOCUMENTS

| | | | | |
|---|---|---|---|---|
| DE | 3216051 | | 10/1983 | |
| DE | 3216051 | A1 * | 11/1983 | B63B 27/36 |
| DE | 199 21 312 | | 11/2000 | |
| EP | 0 877 703 | | 8/1997 | |
| EP | 2 319 755 | | 5/2011 | |
| GB | 2 012 238 | | 7/1979 | |
| JP | 55-059089 | | 5/1980 | |
| JP | 03-064895 | | 3/1991 | |
| JP | 2003-192274 | | 9/2003 | |
| KR | 10-2012-0033854 | | 4/2012 | |
| NO | 140530 | | 6/1979 | |
| NO | 329383 | | 11/2010 | |
| WO | WO 83/03815 | | 11/1983 | |
| WO | WO 2011/034422 | | 3/2011 | |
| WO | WO 2012/002809 | A1 * | 1/2012 | F03D 1/00 |

* cited by examiner

HANDLING LOADS IN OFFSHORE ENVIRONMENTS

This application is the U.S. National Phase of International Application Number PCT/EP2013/060644 filed on May 23, 2013, which claims priority to Great Britain Application No. 1216458.8 filed on Sep. 14, 2012, and Great Britain Application No. 1209131.0 filed on May 24, 2012.

This invention relates to handling loads in offshore environments, for example as experienced in the subsea oil and gas industry.

Whilst this specification will refer to handling structures used in the oil and gas industry to exemplify the invention, the invention may be used in the movement or construction of other offshore structures such as wind turbines or tidal turbines used for harvesting renewable energy.

During the construction and development of a subsea oil or gas field, it is necessary to lower many large and heavy discrete loads from construction vessels to the seabed. Examples of such loads include templates, manifolds and other structures associated with a subsea production system, such as spools. Some such loads may weigh well over 100 tonnes, as a non-limiting example, and some may require a bulky spreader structure to be lifted with them.

The lowering operation can be split into four phases, namely: overboarding, where a load is lifted from storage on the deck of a construction vessel and moved horizontally above the sea; the passage through the splash zone where the load is lowered down through the waves at the sea surface; lowering to depth, where the load descends from the surface to near the seabed; and landing, where the load is finally put down onto the seabed at the desired location.

This invention is concerned with the first two phases of the lowering operation, where the load is subject to various forces that challenge the effective control of its lateral movement. While suspended in the air during overboarding, the load acts as a free pendulum and is subject to wind gusts and vessel movement. The natural period of this pendulous system varies with the length of the lifting tackle and the amplitude of lateral movement may increase due to vessel movement especially. In the second phase, namely entry into the splash zone, waves generate high hydrodynamic forces that drive movement of the load in various directions.

By way of example, the Applicant's deepwater construction vessel Seven Borealis is fitted with an offshore mast crane. The crane comprises a steel mast having a pedestal or base portion upstanding from the working deck of the vessel. The pedestal is fixed in relation to the hull and is surmounted by a rotating slew platform and mast head. The slew platform supports a main boom that can slew about a vertical axis of the mast and that can pivot about a horizontal axis with respect to the mast. The mast head follows the slew motion of the boom so that a boom hoist tackle running from the top of the mast head to the top of the boom can control the inclination of the boom and hence the lifting radius.

FIG. 1 shows another example of a construction vessel used in the subsea oil and gas industry, namely the Applicant's vessel Skandi Seven. That vessel 10 has a wide working deck 12 on which large and heavy objects such as templates can be carried to an offshore installation site. Modular load-handling apparatus such as winches can also be secured to the deck 12 in various positions as may be required.

A large deck-mounted main crane 14 offset to one side of the deck 12 is used for lifting objects outboard from the deck 12 when at the installation site and for lowering them to the seabed. The crane 14 is rated to handle loads of up to 250 tonnes in this example. The crane 14 may also be used for loading such objects onto the deck 12 when the vessel 10 is docked at a quay, although a quayside crane may of course be used for loading instead if one is available.

In this typical example, the crane 14 has a boom 16 that pivots or slews about a fixed pedestal 18 upstanding from the deck 12. The boom 16 slews with respect to the deck 12 and the pedestal 18 to carry an object from the deck 12 into an outboard position clear of the side of the vessel 10, from which position that object may be lowered into the sea.

The boom 16 of the crane 14 is an articulated knuckle boom, shown in FIG. 1 in a compact stowed position to lower its centre of gravity during transit. A knuckle boom has advantages including shortening the length of the lifting tackle hanging between the crane 14 and a load when in use. This makes it easier to control the load by resisting its tendency to swing.

Further to improve lateral control of a load, the crane 14 of the construction vessel 10 is typically supplemented by two or more deck-mounted or crane-mounted tugger winches during overboarding and lowering of large and heavy objects. Tugger winches apply tension to respective wires attached to different locations on an object to control its lateral movement with respect to the boom 16 of the crane 14. For example, synchronised movement of tugger winches may turn the object with the crane 14 as the crane 14 slews relative to the deck 12 into the outboard position. Tugger winches also help to keep the object steady as the vessel 10 pitches and rolls; similarly, they steady the object against disturbance by gusts of wind when it is suspended in the air and by waves and currents when it transits the splash zone upon being lowered into the sea.

Tugger winches represent only a partial solution to the problem of stabilising a load and they suffer from some disadvantages. For example, tugger winches and their wires occupy deck space on a construction vessel, where they may hinder some operations. Also, tugger winches can only apply pulling forces to a load, which compromises their ability to control the load.

In more demanding applications, tugger winches may only be used to assist overboarding and lowering of large and heavy objects in favourable sea states, with a significant wave height of less than 1.5 m. Indeed, tugger winches are potentially dangerous if they are used in higher sea states with a significant wave height of 2.0 m or more. There is a risk that a winch wire will go slack and then suddenly taut if a load swings, which imparts high transient shock loads to the wire and could lead to its failure.

Whilst larger tugger winches may be rented and fitted to the deck of the vessel to handle unusually large loads and more such winches may be used where necessary, more and larger winches are not a solution in high sea states and they tend further to clutter the deck space.

With exploitation of oil and gas fields in ever-harsher marine environments, the inability to use tugger winches in high sea states is a major problem. Delays while waiting on weather can be hugely expensive, tying up marine assets that cost hundreds of millions of US dollars to acquire and that cost hundreds of thousands of US dollars per day to operate. There is also a risk that construction operations must be abandoned if sea conditions deteriorate before those operations are complete.

In some offshore locations, sea states are typically high for long periods, with significant wave heights of 2.0 m to 3.0 m being the norm rather than the exception. This makes it difficult, or even wholly impractical, to propose subsea construction techniques using tugger winches at all. Unfortunately as there has previously been no practical alternative to the use of tugger winches, this problem hinders the effective exploitation of some subsea fields.

U.S. Pat. No. 2,805,781 discloses an early example of a load-stabilised crane for offshore use, with outrigger stabilising wires acting on the lifting tackle. Such an arrangement cannot provide adequate control of larger structures used in subsea production systems.

U.S. Pat. No. 3,850,306 discloses another approach to stabilising a load carried by a marine crane. This involves damping movement of a load by permitting movement in two separate planes and by braking movement in each of those planes. This approach is not useful for the purposes of the present invention.

Whilst offshore load handling is uniquely challenging, control of large loads is not just a problem suffered by offshore cranes. For example, U.S. Pat. No. 3,831,770 discloses a mobile rotary crane with a luffing jib, adapted to place factory-built housing units onto their foundations. As such housing units must be placed precisely where required but are susceptible to the influence of wind gusts during placement, the crane in U.S. Pat. No. 3,831,770 is fitted with a snubbing frame fixed to the pivoting cab of the crane to turn with the jib during slewing. The snubbing frame engages a spreader, via which the crane supports the load. The spreader can slide vertically relative to the jib on guide posts forming part of the snubbing frame. Meanwhile, the engagement between the snubbing frame and the spreader prevents the spreader, and hence the load, moving horizontally relative to the jib.

None of the above prior art proposals provide an appropriate solution in the demanding context of use of the present invention. In particular, the snubbing frame structure proposed in U.S. Pat. No. 3,831,770 would be unsuitable for offshore use in guiding a massive load from a deck to an outboard position and from there down to the surface of the sea and into the splash zone. Whilst the snubbing frame of U.S. Pat. No. 3,831,770 is designed for much lighter duty and for a far less dynamic situation than is contemplated by the present invention, this is not merely a matter of scale but also a matter of structure.

For example, the snubbing frame of U.S. Pat. No. 3,831,770 cannot accommodate movement of the load away from the slewing axis of the crane during a lift. Also, whilst downward extensions may be added to the guide posts to cater for low-level foundations, the snubbing frame cannot handle downward movement of a massive load substantially below the pivot joint of the crane during a lift. It is also notable that a pedestal crane as shown in FIG. 1 could not carry a snubbing frame of the type proposed in U.S. Pat. No. 3,831,770 because the pedestal does not turn relative to the deck. Replacing the entire crane is not a desirable or practical option.

WO 83/03815 and DE 3216051 disclose a cursor to guide the cable of an ROV during overboarding by a hoisting structure. A horizontal extending arm is connected to a vertically-moving carriage by an articulated joint. The arm guides the cable and is not connected to the load. The arm can slew with the crane but only when the carriage is at its uppermost position, so this arrangement would not be capable of guiding the load effectively while the crane slews to lift the load from the deck and then to overboard the load.

EP 0877703 discloses a crane for launching and recovering a boat from and to a larger vessel. A stabilising arm acts as a lever between the boat and the cantilever tip part of the boom of a crane to damp swinging of the boat. Such a system would have to be huge and very heavy, to the detriment of cost and vessel stability, if it were scaled up to stabilise loads of the size contemplated by the present invention.

U.S. Pat. No. 3,850,306 discloses apparatus for controlling swinging movement of a load as the load is lifted from the deck, overboarded and lowered. It comprises a tubular retainer on the end of an articulated boom of a crane, into which a connector attached to the load may be engaged. Effectively the load is docked stiffly with the boom of the crane whenever the load is out of the water. The tip of the boom is lowered close to the water before the connector is disengaged from the retainer to transfer the load to the wire and to lower the load into the sea. This is of no use for loads of the size contemplated by the present invention.

JP 2003192274 discloses a vertically-expanding stabilising structure between a load and the boom of a crane that suspends the load. This is not apt to resist lateral loads and is of no use for the purposes of the invention.

JP 55059089 discloses apparatus for overboarding a load that comprises upright rails on the hull of the vessel, along which wheels attached to the load run to guide the load into the sea. The apparatus is a davit rather than a crane and it has no facility for slewing. Similarly, EP 2319755, JP 03064895, US 2009/0199757, KR 1020120033854 and DE 19921312 to Schwarz do not disclose slewing cranes or, therefore, any facility for controlling a load as a crane slews.

In WO 2011/034422, a trolley sliding vertically along a hoisting structure does not guide the load but only guides a wire attached to the load. The trolley is used for heave compensation and so controls only vertical motion. As the load can still swing, this does not solve the problem addressed by the present invention.

GB 2012238 and NO 140530 disclose an arrangement for launching or recovering an object such as a boat from a body of water. A floating dock is suspended from a crane to float on the water for recovering or releasing the object. The dock is held between the crane and a submerged lower beam by upper and lower wires acting in tension. Tensioned wires provide ineffective lateral control of a heavy load and there is no provision for slewing.

U.S. Pat. No. 4,310,277 discloses a cargo-transfer apparatus in which a trolley is movable along a linkage to move a hoist line along the linkage while the line changes length. In this way, cargo connected to the hoist line can be moved along the linkage. However, as the load can swing below the trolley and the linkage, this does not solve the problem addressed by the present invention.

US 2009/0261052 and NO 329383 relate to deepwater deployment operations in which a tugger line is used to guide and to transfer a load. The disclosure is of no use when overboarding a load or during passage of a load through the splash zone.

Against this background, the invention resides in a method of overboarding a load from a water-borne vessel using a vessel-mounted slewing crane and lowering that load into the water. The method comprises placing at least one crane-mounted guide member between the load and the crane, specifically an upstanding supporting structure of the crane such as a pedestal or a mast, which structure is preferably fixed relative to a hull of the vessel and in that case supports a slewing mechanism that defines a slewing axis of the crane. Then, while the guide member acts in compression to restrain horizontal movement of the load toward the slewing axis, the method further comprises: using the crane to lift the load above a deck of the vessel; slewing a boom of the crane to move the load from above the deck into an outboard over-water position while moving the guide member with the boom; and using the crane to lower the load from the outboard position into the water while lowering the guide member with the load.

For optimum control of the load, the guide member is preferably lowered to a level below the deck while lowering the load from the outboard position into the water. Indeed, the guide member may be lowered with the load into the water. However it is also possible for the load to move downwardly relative to the guide member while the guide member continues to restrain horizontal movement of the load relative to the boom of the crane. For example, the guide member may be shaped to engage a complementary formation of the load, with a vertically-extending channel for guiding downward movement of the load with respect to the guide member.

Advantageously, the guide member also acts in tension between the load and the crane.

It is preferred that the guide member may be extended to accommodate movement of the load away from the slewing axis of the crane and/or geometric requirements while lowering the load from the outboard position into the water. Advantageously, two or more guide members may be placed between the crane and respective spaced locations on the load, in which case the guide members may be extended differentially to control orientation of the load relative to the boom of the crane.

The guide member may be placed beside the load as a barrier to restrain horizontal movement of the load, optionally engaging a complementary formation of the load to resist relative horizontal movement between the guide member and the load.

Elegantly, the guide member may be movable in synchronisation with the crane, for example being movable around and relative to a supporting pedestal or mast of the crane in synchronisation with movement of the boom of the crane.

A control system for moving the guide member may be synchronised with the crane control system so that a crane driver can move the guide member together with the crane, for example in a slaved relationship. Alternatively a separate control system could be used for the guide member. Synchronisation with the crane is preferred as it eases control and avoids involving additional personnel.

The inventive concept also embraces a crane-mountable guide apparatus for assisting a vessel-mounted slewing crane to overboard and lower a load from a vessel into water, the apparatus comprising at least one guide member that can be positioned between the load and an upstanding supporting structure of the crane, wherein the guide member is capable of acting in compression to restrain horizontal movement of the load toward a slewing axis of the crane, and is movably connected to a mount to move with the load relative to the mount as the crane lifts the load above a deck of the vessel, as a boom of the crane slews to move the load from above the deck into an outboard over-water position and as the crane lowers the load from the outboard position into the water.

To carry out preferred operations of the method of the invention, the guide member is preferably extendable in length from the mount toward the load. For example, first and second guide members may be extendable differentially to control orientation of the load relative to the boom of the crane. Similarly, it is preferred that the guide member is also capable of acting in tension between the load and the crane.

The mount is suitably arranged for attachment to a pedestal or mast of the crane, for example to embrace and surround a pedestal or mast of the crane so that the guide member can turn around the pedestal or mast, preferably being driven by the mount around the pedestal or mast.

The guide member suitably comprises an arm that is pivotable with respect to the mount. The guide member may comprise a frame that is movably connected to the mount and that can be lowered relative to the mount. Such a frame may be interchangeably removable from the mount to suit different loads, and may be movably connected to the mount via a linkage that comprises at least one arm that swings downwardly to lower the frame with the load.

The guide member may comprises an element such as a pad that is movable downwardly with the load with respect to the frame.

The inventive concept further includes a method of adapting a vessel-mounted crane to assist with overboarding and lowering a load from a vessel into water, which method comprises attaching a guide apparatus of the invention to an upstanding supporting structure of the crane via the mount of that apparatus.

The inventive concept also extends to a crane operating in accordance with the method of the invention or fitted with the guide apparatus of the invention, for example comprising a fixed pedestal, mast or other upstanding supporting structure to which the mount is attached. The inventive concept extends to a vessel operating in accordance with the method of the invention, or fitted with the guide apparatus or the crane of the invention.

The guide member need not be absolutely rigid but it is preferably sufficiently rigid to work in tension, flexion and compression, unlike a tugger wire that can only work in tension as it has no rigidity in flexion nor in compression. The guide member can comprise, or be supported by, at least one beam, bar, rod or extending cylinder.

The invention provides a multi-purpose transverse load damper to ease overboarding and lowering of large modules over the side of an installation vessel when using a crane, and that is suitable to be supported by the crane itself. The invention increases the weather limits for the overboarding and lowering operation and makes the operation safer.

Reference has already been made to FIG. 1 of the accompanying drawings, which is a perspective view from above the stern of Skandi Seven as an example of a construction vessel with which the invention may be used. In order that the invention may be more readily understood, reference will now be made, by way of example, to the remainder of the drawings in which.

Figure 2:
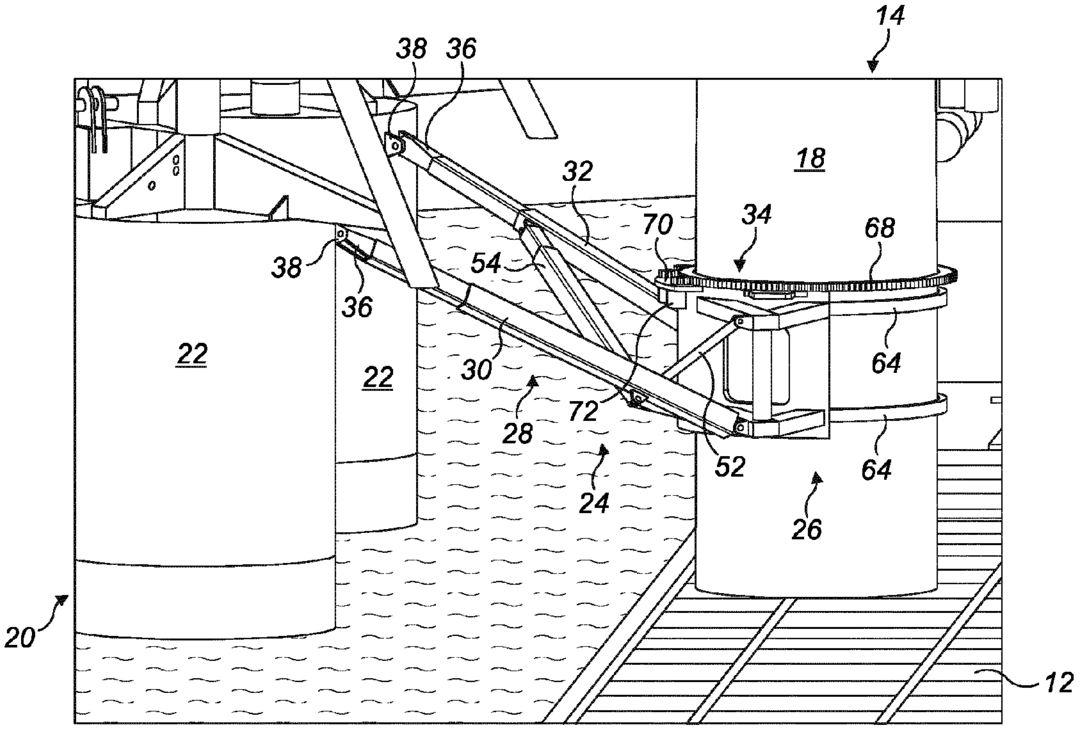
FIG. 2 is a perspective view showing a pedestal of a main crane of a construction vessel, adapted by the addition of a guide apparatus in accordance with the invention, shown here guiding a load in the form of a template/manifold module held temporarily in an elevated outboard position.
Figure 3:
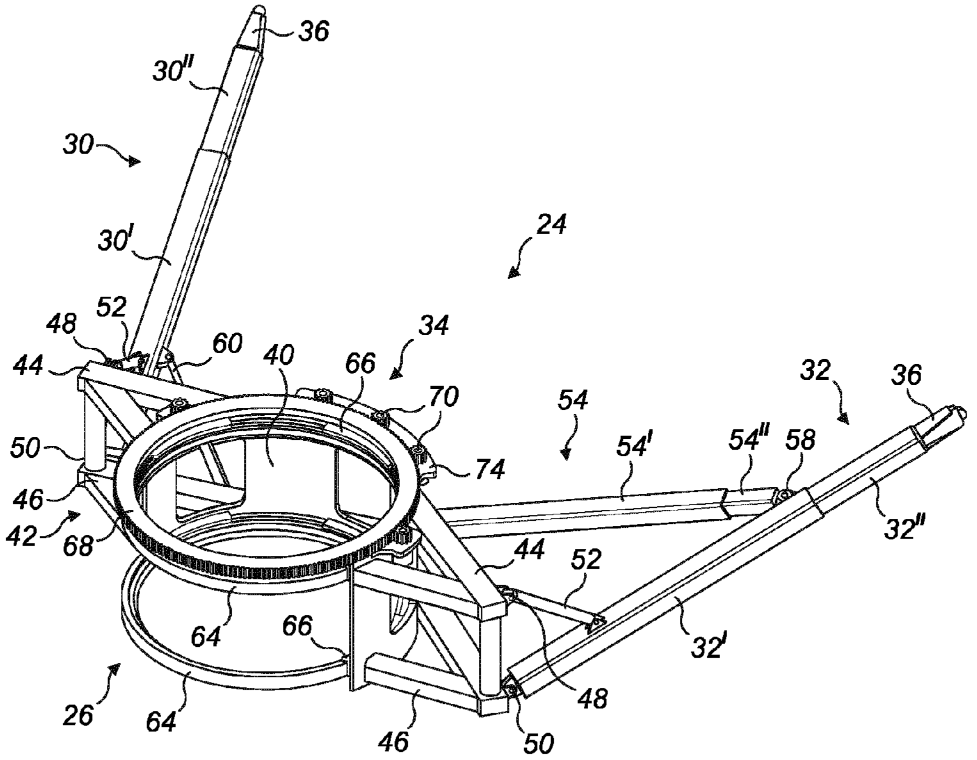
FIG. 3 is a perspective view of the guide apparatus shown in FIG. 2 but in isolation.
Figure 4:
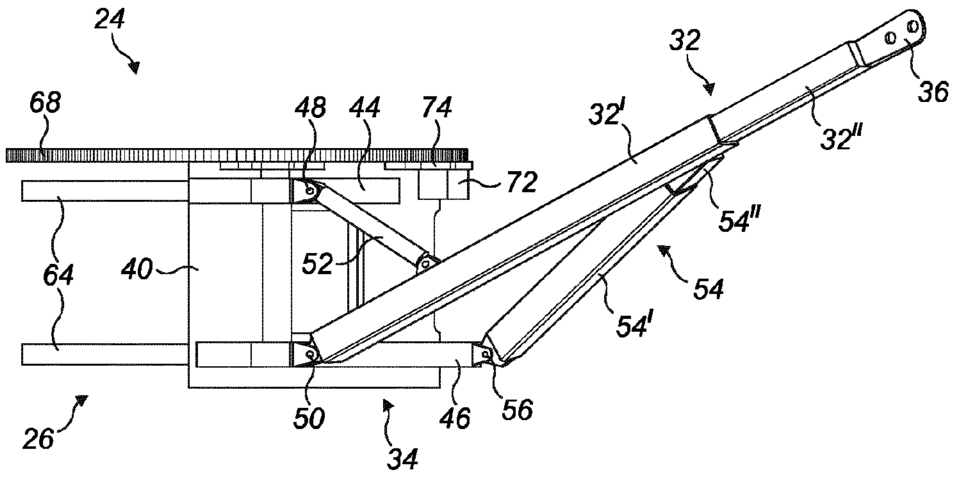
FIG. 4 is a side view of the guide apparatus shown in FIG. 3.
Figure 5:
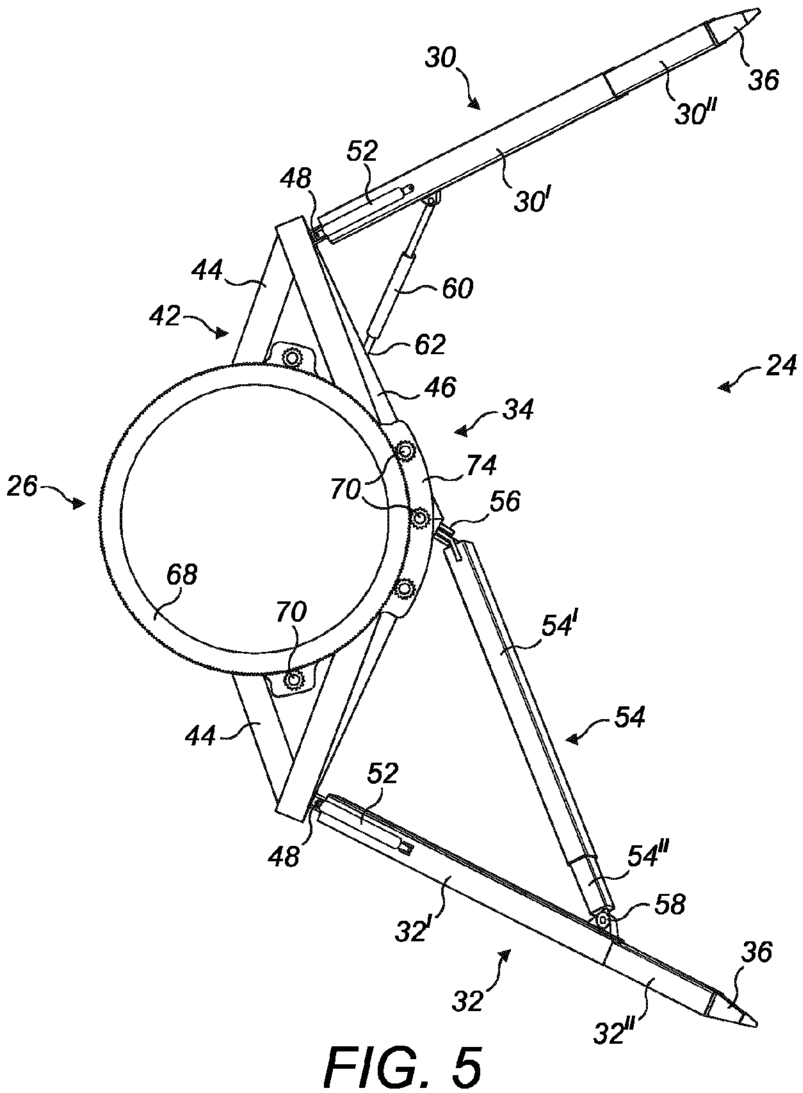
FIG. 5 is a top plan view of the guide apparatus shown in FIGS. 3 and 4.
Figure 7:
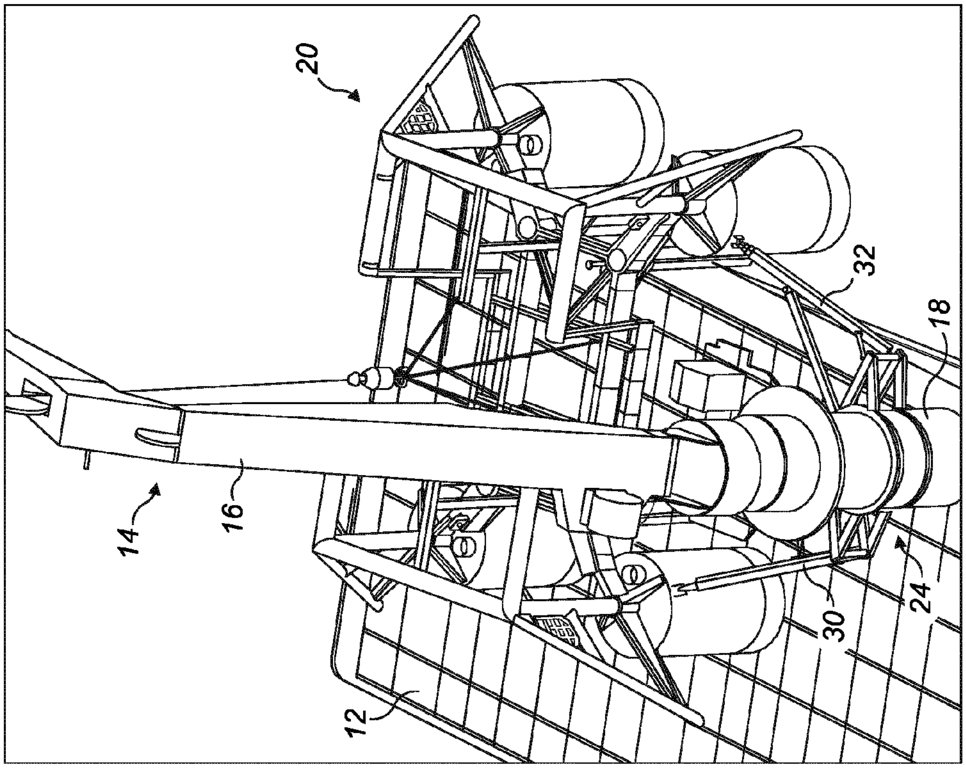
Figure 6:
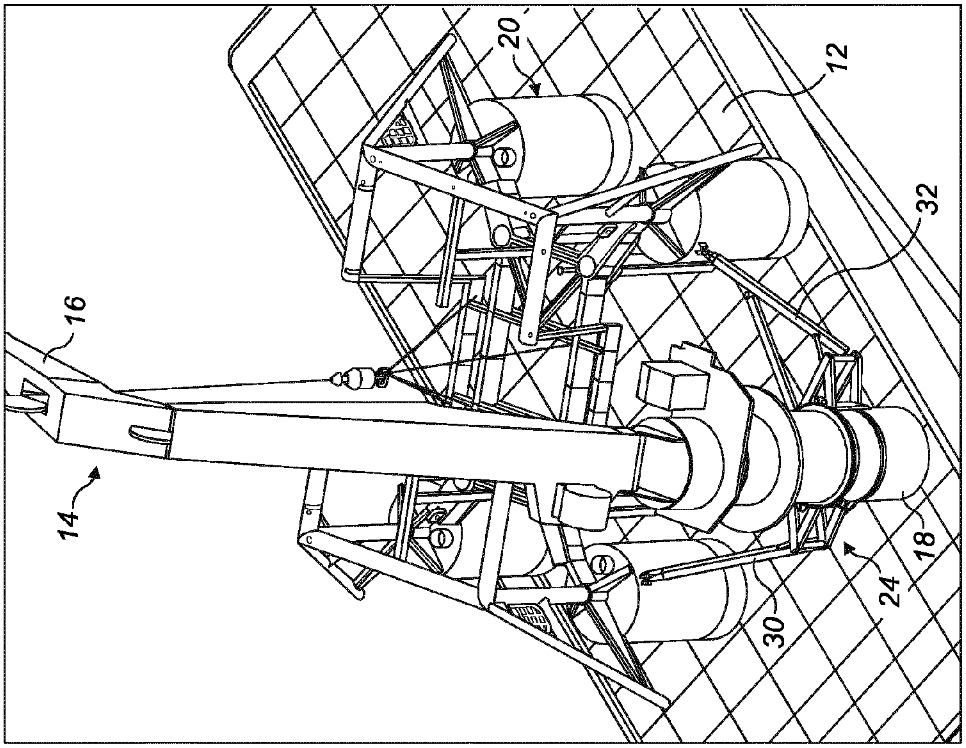
Figure 9:
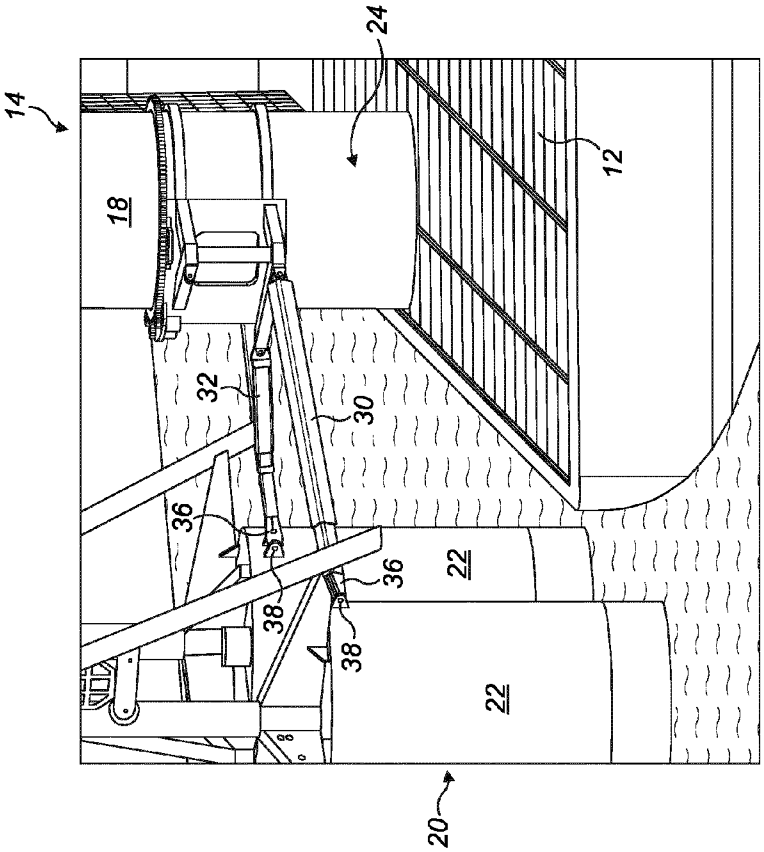
Figure 8:
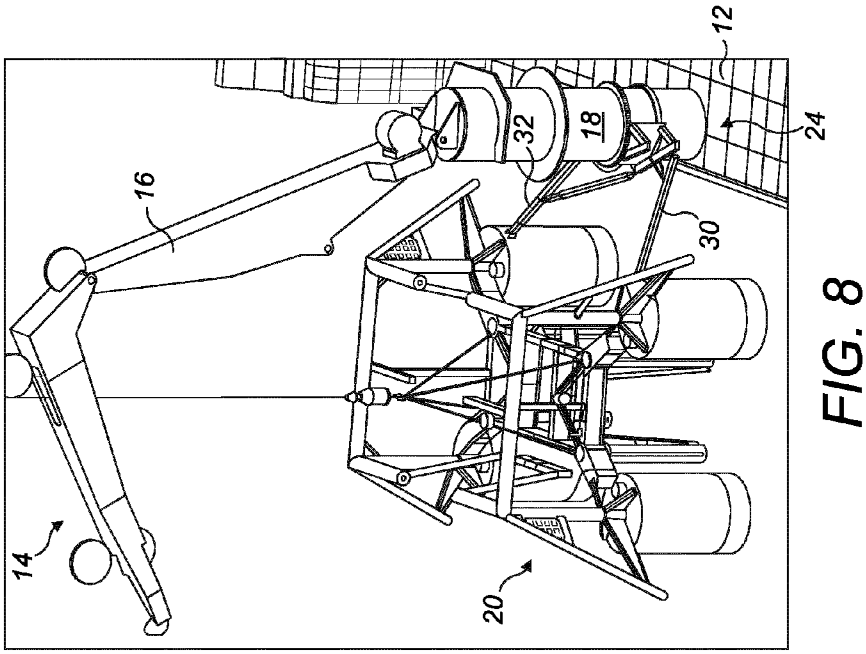
Figure 11:
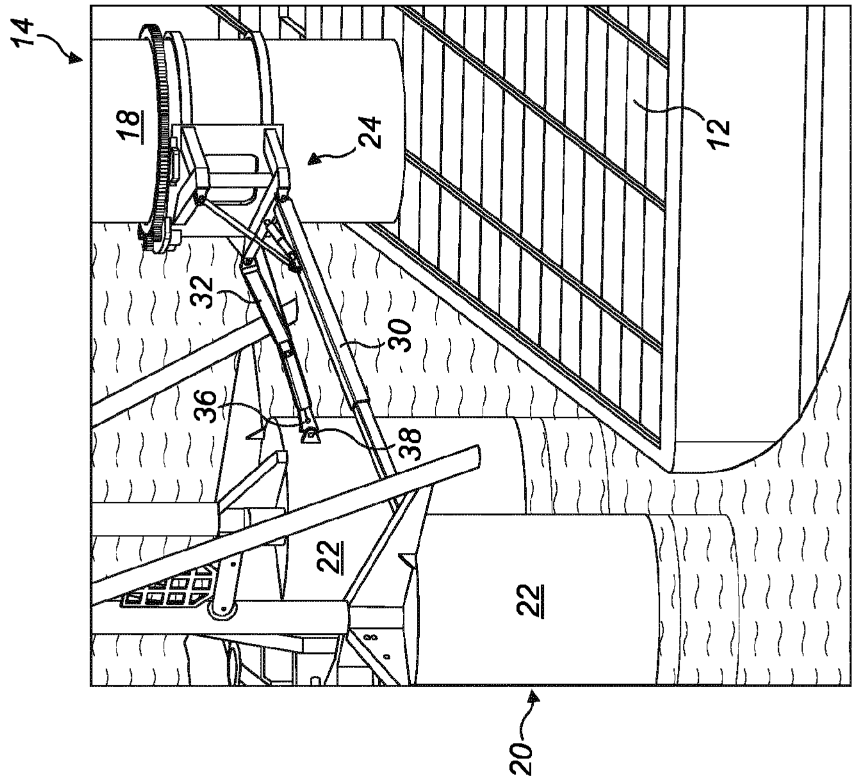
Figure 10:
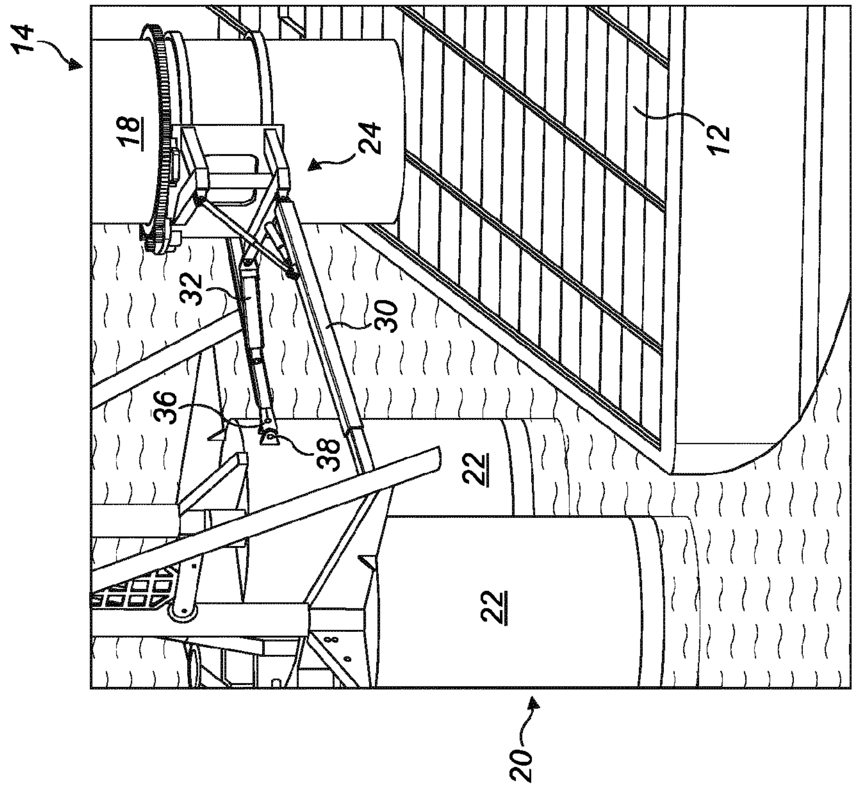

FIGS. 6 to 8 together form a sequence of perspective views of the guide apparatus of FIGS. 3 to 5 mounted to the pedestal of the main crane while moving a load from the deck of the vessel to an outboard position;

FIGS. 9 to 11 together form a sequence of enlarged perspective views showing movement of the guide apparatus as the load is being lowered by the crane into the sea from the elevated outboard position shown in FIG. 2.

Figure 12:
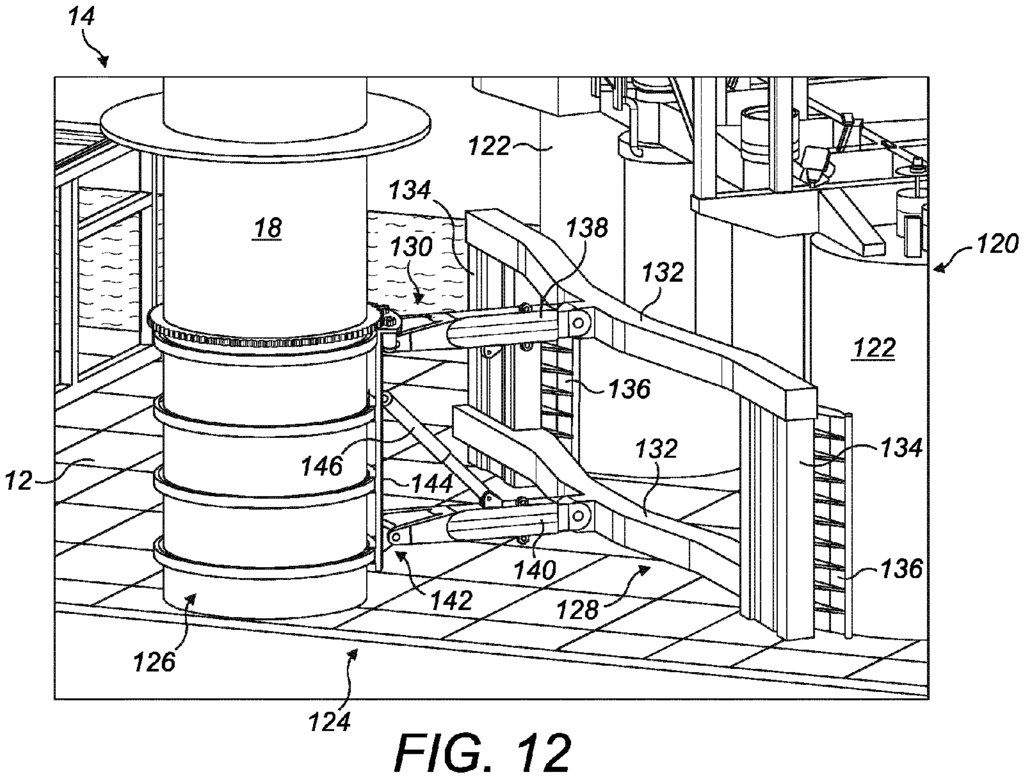
Figure 13:
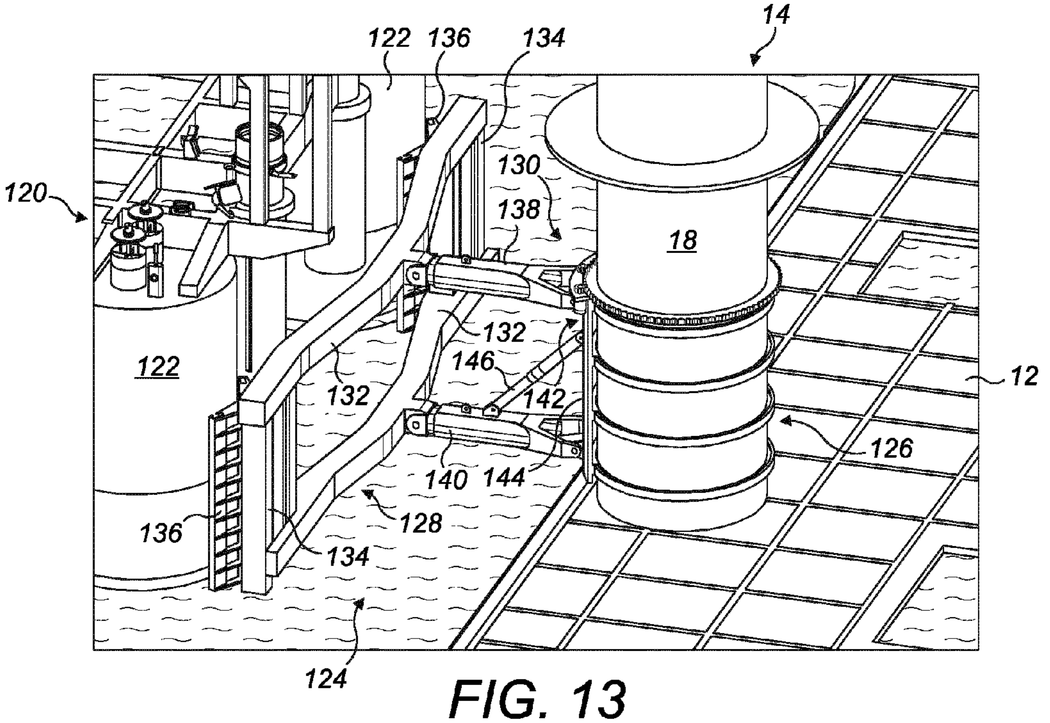
Figure 15:
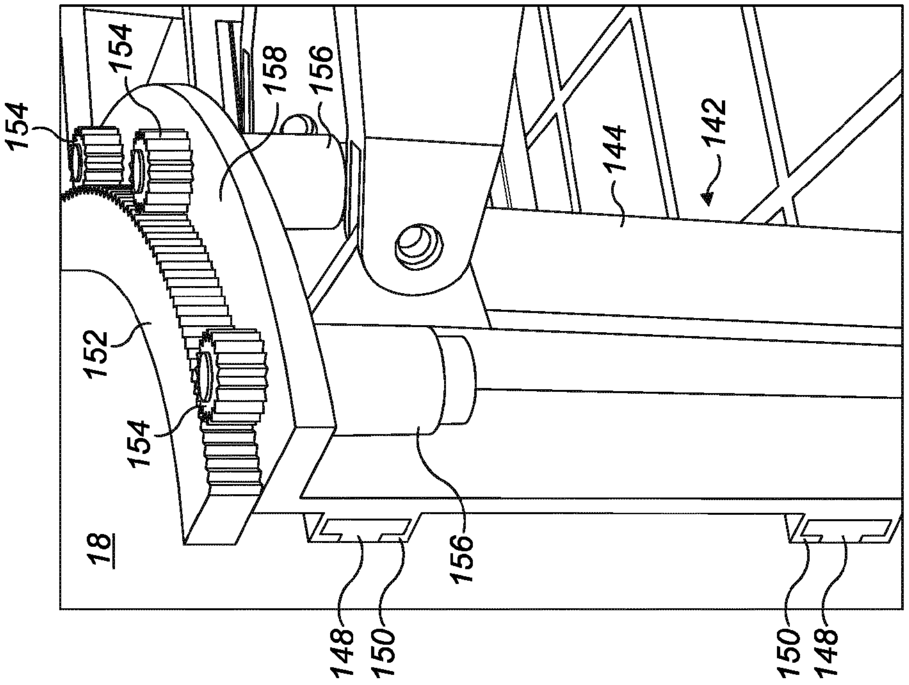
Figure 14:
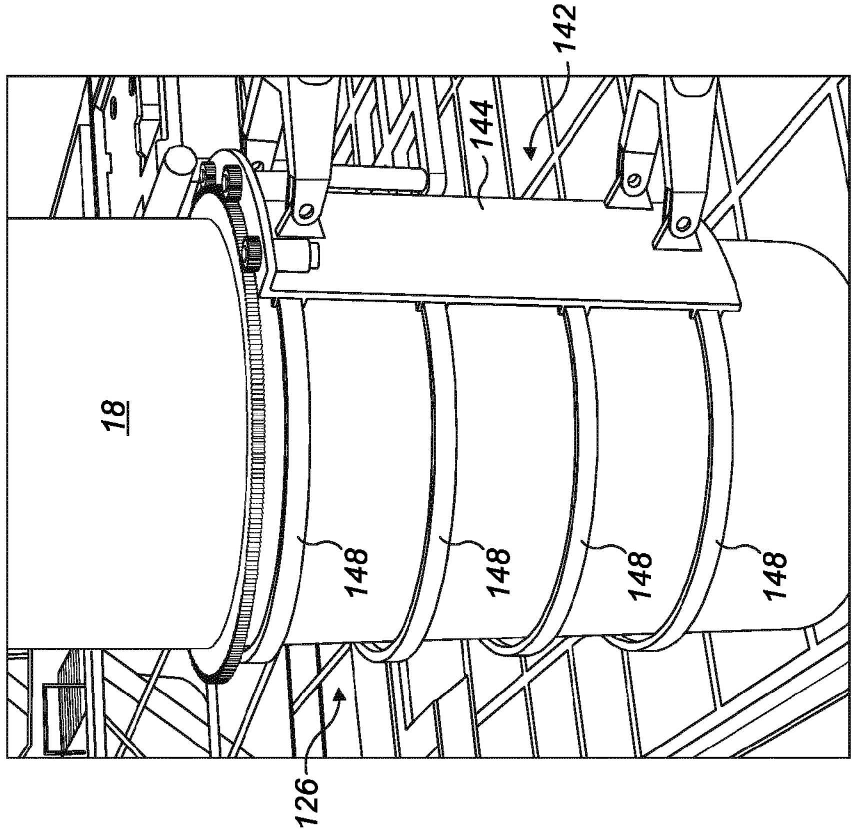

FIG. 12 is a perspective view showing a pedestal of a main crane of a construction vessel, adapted by the addition of another guide apparatus in accordance with the invention, shown here again guiding a load in the form of a template/manifold module;

FIG. 13 corresponds to FIG. 12 but shows the pedestal from another side, with the load and the guide apparatus turned about the pedestal into an outboard position;

FIGS. 14 and 15 are enlarged perspective views showing details of support and drive arrangements for the guide apparatus shown in FIGS. 12 and 13, which may also be applied to the guide apparatus shown in FIGS. 2 to 11;

FIGS. 16 to 19 together form a sequence of perspective views of the crane and guide apparatus of FIGS. 12 and 13 while moving the load from the deck to an outboard position; and FIGS. 20 to 23 together form a sequence of enlarged perspective views showing movement of the guide apparatus as the load is being lowered by the crane into the sea from the outboard position.

Figure 1:
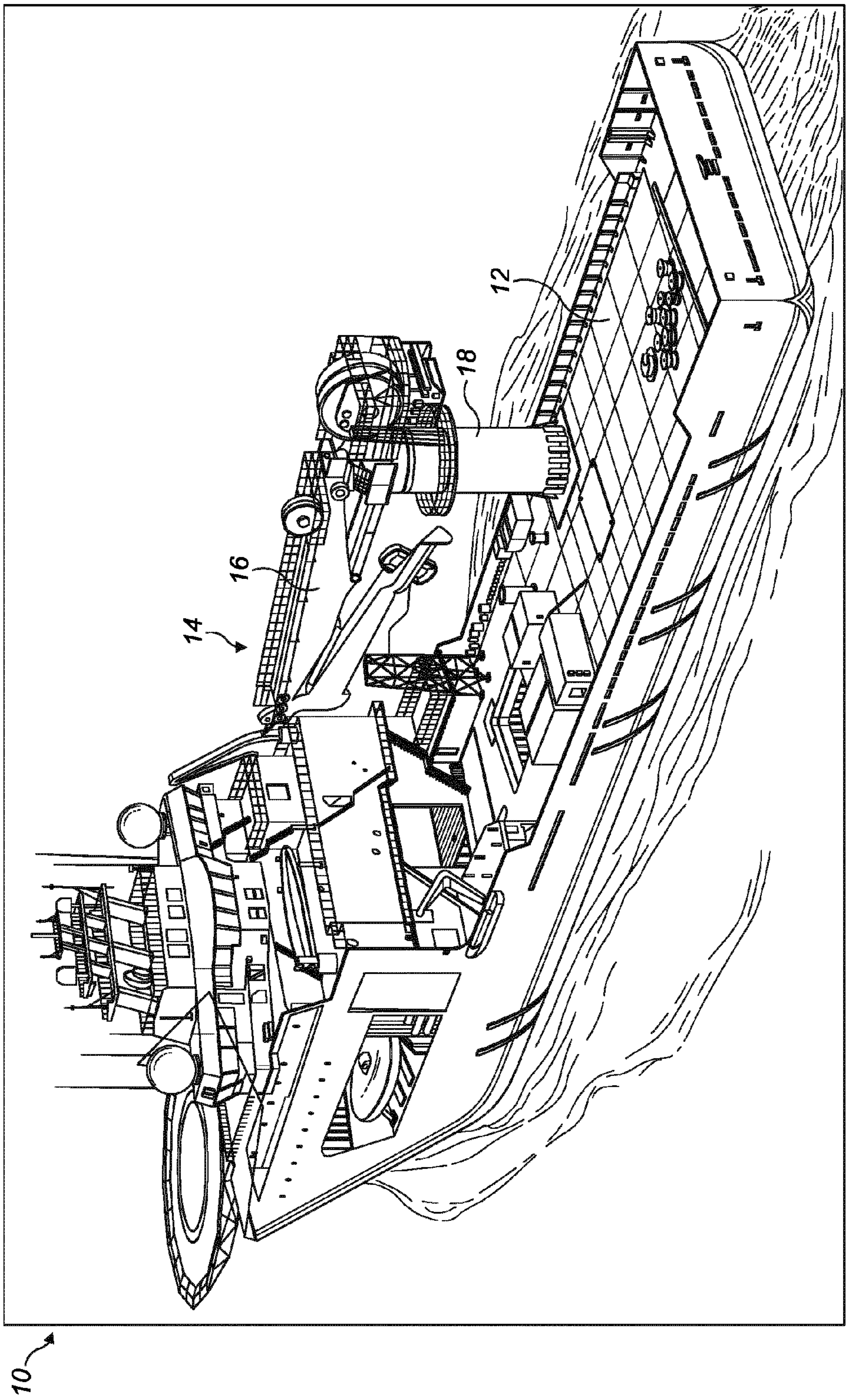

Referring firstly to FIG. 2, this shows:

- the circular-section cylindrical fixed pedestal 18 of a crane 14 upstanding from a deck 12 of a construction vessel, that crane 14 having a boom 16 that is not visible in FIG. 2 but is shown in FIG. 1;
- a load 20 supported by the crane 14 via the boom 16, the load 20 being a template/manifold module in this example, having integral suction piles 22; and
- a guide apparatus 24 in accordance with the invention disposed between the pedestal 18 and the load 20, being mounted to the pedestal 18 and being attached to the load 20 to restrain horizontal movement of the load 20 relative to the boom 16 of the crane 14.

As best shown in FIGS. 3 to 5, the guide apparatus 24 comprises:

- a mount arrangement 26 that mounts the guide apparatus 24 to the pedestal 18; and
- a support mechanism 28 extending between the mount arrangement 26 and a pair of suction piles 22 at one side of the load 20 to track and to drive radial and vertical movement of the load 20 with respect to the pedestal 18.

The circular mount arrangement 26 provides for, and drives, angular circumferential movement of the support mechanism 28 around the pedestal 18, and hence with respect to the deck 12 of the vessel 10, to correspond with slewing movement of the boom 16. Conversely, the support mechanism 28 accommodates movement of the load 20 vertically and radially; optionally the support mechanism 28 also drives movement of the load 20 with respect to the mount arrangement 26 and hence with respect to the pedestal 18 and the deck 12. For example, the support mechanism 28 can turn the load 20 about the lifting tackle that suspends the load 20 from the boom 16 of the crane 14.

In general, movement of the support mechanism 28 is preferably slaved to movement of the boom 16 and the lifting tackle of the crane 14.

The support mechanism 28 comprises two arms 30, 32. At its inner end, each arm 30, 32 is pivotably attached to a carriage 34 supported by the mount arrangement 26. At its outer end, each arm 30, 32 is pivotably and removably attached to the load 20, in this instance to respective suction piles 22 of the load 20. The arms 30, 32 are shown in FIG. 2 in a raised position, consistent with the load 20 being supported by the crane 14 in an elevated outboard position before being lowered into the sea.

The arms 30, 32 are extensible, for example by being telescopic as shown, to vary their length independently or in unison to move the load 20, or an attached part of the load 20, radially with respect to the pedestal 18. Specifically, each arm 30, 32 comprises an inner female section 30', 32' and an outer male section 30", 32" that can slide within the associated female section 30', 32'.

By varying their length independently, the arms 30, 32 can turn the load 20 about the lifting tackle that suspends the load 20. Conversely, the arms 30, 32 can maintain orientation of the load 20 with respect to the hull of the vessel as the load 20 translates during slewing of the crane 14 or extension of the boom 16. The provision to vary the length of the arms 30, 32 may also help the arms 30, 32 to absorb radially-inward shock loadings if the load 20 should swing away from and back toward the pedestal 18 in use.

The pivotable attachment between the arms 30, 32 and the load 20 is effected by a known remote-controlled latch mechanism 36 at the free end of each arm 30, 32. The latch mechanism 36 comprises a movable release hook that loosely engages a padeye 38 welded to a suction pile 22 of the load 20, such that the arm 30, 32 can pivot relative to the padeye 38 in more than one plane. The hook of the latch mechanism 36 can be disengaged from the padeye 38 to release the load 20 when the load 20 has been lowered into the sea, as will be explained.

The carriage 34 comprises a vertically-extending plate 40, whose inner side is concave-curved in plan view to seat against the convex-curved pedestal 18 of the crane 14. The carriage 34 further comprises an outrigger frame 42 attached to the plate 40, which frame 42 is diamond-shaped in plan view to define opposed pairs of triangular upper and lower outriggers 44, 46.

The outriggers 44, 46 extend laterally in parallel from the plate 40 in respective vertically-spaced horizontal planes to upper and lower pivots 48, 50. The pivots 48, 50 are near-diametrically opposed about the circular mount arrangement 26 with respect to their counterparts on the opposite outriggers 44, 46. Each arm 30, 32 is pivotably attached at its inner end to a respective one of the lower pivots 50 on the lower outriggers 46.

The opposed arrangement of the lower outriggers 46 that places the lower pivots 50 in opposition about the mount arrangement 26 is advantageous as this feeds loads from the arms 30, 32 circumferentially into the tubular pedestal 18 of the crane 14.

Vertical movement of the arms 30, 32 is controlled by hydraulic cylinders 52 that each extend in a vertical plane to a respective arm 30, 32 from a respective one of the upper pivots 48 on the upper outriggers 44. The hydraulic cylinders 52 are passive dampers in this embodiment but they could instead be actuators that are capable of moving the arms 30, 32 vertically. For example, actuators could impart active damping or heave-compensating forces to the arms 30, 32, or they could lift the arms 30, 32 into a raised position after the load 20 has been overboarded and detached from the arms 30, 32 to be lowered toward the seabed.

Horizontal movement of the arms 30, 32 is controlled by different measures for each arm 30, 32. Specifically, one arm 32 has an extensible strut 54 that extends from a central pivot 56 between the lower outriggers 46 of the outrigger frame 42 to an outer pivot 58 near the outer end of the female section 32'. The strut 54 is telescopic, comprising an inner female section 54' and an outer male section 54" and is an actuator that extends and retracts to pivot the arm 32 horizontally with respect to the carriage 34.

A further hydraulic cylinder 60 extends to the other arm 30 from an inner pivot 62 on the associated lower outrigger 46. Again, the hydraulic cylinder 60 could be an actuator that is capable of moving the arm 30 horizontally but in this example it is a passive damper. Horizontal movement of the arm 30 when attached to the load 20 therefore passively follows horizontal movement of the arm 32 when also attached to the load 20, as driven by the strut 54.

In a similar manner to the second embodiment as shown most clearly in FIGS. 14 and 15 of the drawings, the mount arrangement 26 supports the plate 40 of the carriage 34 on a pair of support rings 64 that encircle the pedestal 18 in vertically-spaced horizontal planes. Each support ring 64 is fixed to the pedestal 18, preferably by welding, and has a T-section that is received as a sliding fit by a complementary C-section channel 66 on the inner side of the plate 40.

The mount arrangement 26 further includes a drive mechanism comprising a rack ring 68 encircling the pedestal 18 in a horizontal plane just above the uppermost support ring 64. Again, the rack ring 68 is fixed to the pedestal 18, preferably by welding. The rack ring 68 has a toothed outer face engaged by vertical-axis pinion gears 70. The pinion gears 70 are driven by respective motors 72 that are supported by upper flanges 74 integral with the plate 40 of the carriage 34. The motors 72 may be hydraulic or electric motors.

The motors 72 drive the pinion gears 70 around the rack ring 68, hence driving the carriage 34 and the remainder of the guide apparatus 24 around the pedestal 18 to correspond with slewing movement of the boom 16. Preferably, the motors 72 are controlled by a control system that is integrated with or responsive to a control system of the crane 14 itself. In that way, the guide apparatus 24 can move around the pedestal 18 in angular alignment with the boom 16, in a manner that is automatically synchronised with the slewing movement of the boom 16. This simplifies operation of the system and improves safety by avoiding the need for additional personnel on the deck 12 during an overboarding and lowering operation, which would also present the additional challenge of effective communication between such personnel.

Automatic synchronisation between the guide apparatus 24 and the crane 14 may also allow the arms 30, 32 to move up or down in response to any heave compensation movements of the crane 14 or its lifting tackle during lifting.

In principle, the mount arrangement 26 allows the guide apparatus 24 to assist the crane 14 in handling equipment placed anywhere on the deck 12 in a 360° arc around the pedestal 18.

The mount arrangement 26 allows the guide apparatus 24 to be attached to an existing crane installation with minimal modification, although it may be decided to reinforce the pedestal 18 to withstand cross-axial forces that may be exerted by the load 20 through the guide apparatus 24.

Turning now to the sequence of views in FIGS. 6 to 8 of the drawings, these show how the crane 14 and the guide apparatus 24 work together as the boom 16 of the crane 14 slews to move a load 20 from the deck 12 to a position outboard of the vessel 10.

FIG. 6 shows the boom 16 having lifted the load 20 slightly above the deck 12. Next, the boom 16 of the crane 14 slews through the intermediate position shown in FIG. 7 with respect to the stationary pedestal 18 of the crane 14. The guide apparatus 24 slews around the pedestal 18 in unison with the boom 16, hence remaining aligned with the load 20 to maintain control of its horizontal position with respect to the boom 16. Finally the boom 16 projects orthogonally from the side of the vessel 10 as the load 20 reaches the fully outboard position shown in FIG. 8. The load 20 is now ready to be lowered into the sea, as will be explained with reference to the next sequence of views in FIGS. 9 to 11.

FIGS. 9 to 11 show how the guide apparatus 24 continues guiding the load 20 as the load 20 is lowered into the sea while the boom 16 of the crane 14 remains in the fully outboard position.

FIG. 9 shows the load 20 and the guide apparatus 24 lowered slightly from the elevated outboard position shown in FIG. 2. As the crane 14 starts to lower the load 20 into the sea as shown in FIG. 10 and the load is immersed further as shown in FIG. 11, the arms 30, 32 swing down slowly to follow the load 20. The arms 30, 32 extend as they swing down to maintain the same radial spacing between the load 20 and the pivot axis of the crane 14. Alternatively, if there is enough clearance between the load 20 and the hull of the vessel 10, the boom 16 of the crane 14 can be pulled back slightly as the load 20 is lowered, to compensate for downward swinging of the arms 30, 32 by reducing the radial spacing between the pivot axis and the load 20.

When the load 20 has been lowered as far as the arms 30, 32 allow, the latch mechanisms 36 are operated remotely to release the hooks from the padeyes 38 on the load 20. The load 20 is then free to be lowered quickly by the crane 14 away from the splash zone toward the seabed. Once the load 20 has been landed on the seabed and detached from the lifting tackle, the boom 16 of the crane 14 can be slewed back inboard. With the arms 30, 32 raised if necessary, the guide apparatus 24 can be turned back around the pedestal 18 of the crane 14 to track the inboard slewing of the boom 16.

Moving on now to a second embodiment of the invention shown in FIGS. 12 to 23 of the drawings, again a crane 14 of a construction vessel has a cylindrical fixed pedestal 18 of circular section upstanding from a deck 12. A load 120 is supported by the crane 14 via a boom 16, the load 120 in this example again being a template/manifold module having integral suction piles 122. Again, a guide apparatus 124 mounted to the pedestal 18 is disposed between the pedestal 18 and the load 120. The guide apparatus 124 bears against a side of the load 120 as a barrier to restrain horizontal movement of the load 120 relative to the boom 16 of the crane 14.

As best shown in FIGS. 12 and 13, the guide apparatus 124 comprises:

- a mount arrangement 126 that mounts the guide apparatus 124 to the pedestal 18;
- a rigid handling frame 128 that, in this example, bears against a pair of suction piles 122 at one side of the load 120; and
- a linkage 130 that movably connects the handling frame 128 to the mount arrangement 126 to track radial and vertical movement of the load 120 with respect to the pedestal 18.

The mount arrangement 126 provides for, and drives, angular circumferential movement of the linkage 130 and the handling frame 128 around the pedestal 18 and hence with respect to the deck 12 of the vessel 10. Conversely, the linkage 130 provides for movement of the handling frame 128 vertically and optionally also radially with respect to the mount arrangement 126 and hence with respect to the pedestal 18 and the deck 12.

The handling frame 128 comprises parallel vertically-spaced horizontal beams 132 joined by uprights 134 at each end. The uprights 134 support guide members in the form of pads 136 in horizontally-spaced positions that align with respective suction piles 122 of the load 120. The pads 136 are concave-curved in plan view to seat against, and hence to engage laterally with, the convex sides of the suction piles 122. In this example, the pads 136 are movable vertically along the uprights 134 of the handling frame 128, to follow downward movement of the load 120. The pads 136 are preferably driven down along the uprights 134 by a suitable drive mechanism; alternatively, the pads 136 can simply be unlatched at a suitable time during an overboarding and lowering operation to drop under gravity relative to the uprights 134.

When the pads 136 are lowered, they extend the vertical range of guided movement provided by the guide apparatus 124 to the load 120. So, only some of that vertical range of guided movement is due to downward movement of the handling frame 128 via the linkage 130 as will be explained; the rest of the vertical range of guided movement is due to downward movement of the pads 136 with respect to the handling frame 128.

The linkage 130 that connects the handling frame 128 to the mount arrangement 126 is a parallelogram linkage comprising parallel upper and lower arms 138, 140. The linkage 130 is shown here holding the handling frame 128 in a raised position consistent with handling the load 120 when the load 120 is above the deck 12 and is moved into the outboard position shown in FIG. 13.

Each arm 138, 140 of the linkage 130 is pivotably attached at its outer end to a respective horizontal beam 132 of the handling frame 128. At its inner end, each arm 138, 140 is pivotably attached to a carriage 142 supported by the mount arrangement 126. The carriage 142 comprises a vertically-extending plate 144, whose inner side is concave-curved in plan view to seat against the convex-curved pedestal 18 of the crane 14.

The arms 138, 140 are optionally extensible, for example by being telescopic with male and female sections as shown, to vary their length in unison to move the handling frame 128 radially with respect to the pedestal 18. Again, the provision to vary the length of the arms 138, 140 may also help the arms 138, 140 to absorb radially-inward shock loadings if the load 120 should swing away from and back against the handling frame 128 in use.

A fully-rotating hinge function at the connection points where the arms 138, 140 connect to the handling frame 128 avoids force components being imparted from the load 120 to the arms 138, 140 due to pitching and rolling movements.

An hydraulic cylinder 146 extends from the lower arm 140 to the plate 144 of the carriage 142 to control vertical movement of the handling frame 128 with respect to the pedestal 18. The hydraulic cylinder 146 may be a passive damper but is preferably an actuator that is capable of imparting active damping or heave-compensating forces and of lifting the handling frame 128 into the raised position after the load 120 has been overboarded and is being lowered into the sea.

Moving on now additionally to the detail views of FIGS. 14 and 15, the mount arrangement 126 supports the plate 144 of the carriage 142 on an array of support rings 148 that encircle the pedestal 18 in vertically-spaced horizontal planes. As before, each support ring 148 is fixed to the pedestal 18, preferably by welding. The enlarged part-sectional view of FIG. 15 shows that each support ring 148 has a T-section that is received as a sliding fit by a complementary C-section channel 150 on the inner side of the plate 146.

FIG. 15 also shows the drive mechanism of the mount arrangement 126, comprising a rack ring 152 encircling the pedestal 18 in a horizontal plane just above the uppermost support ring 148. Again, the rack ring 152 is fixed to the pedestal 18, preferably by welding and has a toothed outer face engaged by vertical-axis pinion gears 154. The pinion gears 154 are driven by respective hydraulic or electric motors 156 that are supported by an upper flange 158 integral with the plate 144 of the carriage 142. The motors 156 drive the pinion gears 154 around the rack ring 152 to drive the carriage 142 and the remainder of the guide apparatus 124 around the pedestal 18 to correspond with slewing movement of the boom 16.

As before, the motors 156 are suitably controlled by a control system that is integrated with or responsive to a control system of the crane 14 itself. In that way, the guide apparatus 124 moves around the pedestal 18 in synchronisation with the boom 16, simplifying operation of the system and improving safety. Automatic synchronisation between the guide apparatus 124 and the crane 14 may also allow the guide apparatus 124 to move up or down in response to any heave compensation movements of the crane 14 or its lifting tackle during lifting.

Turning now to the sequence of views in FIGS. 16 to 19, these show how the crane 14 and the guide apparatus 124 work together as the boom 16 of the crane 14 slews to move a load 120 from the deck 12 to a position outboard of the vessel 10.

Figure 16:
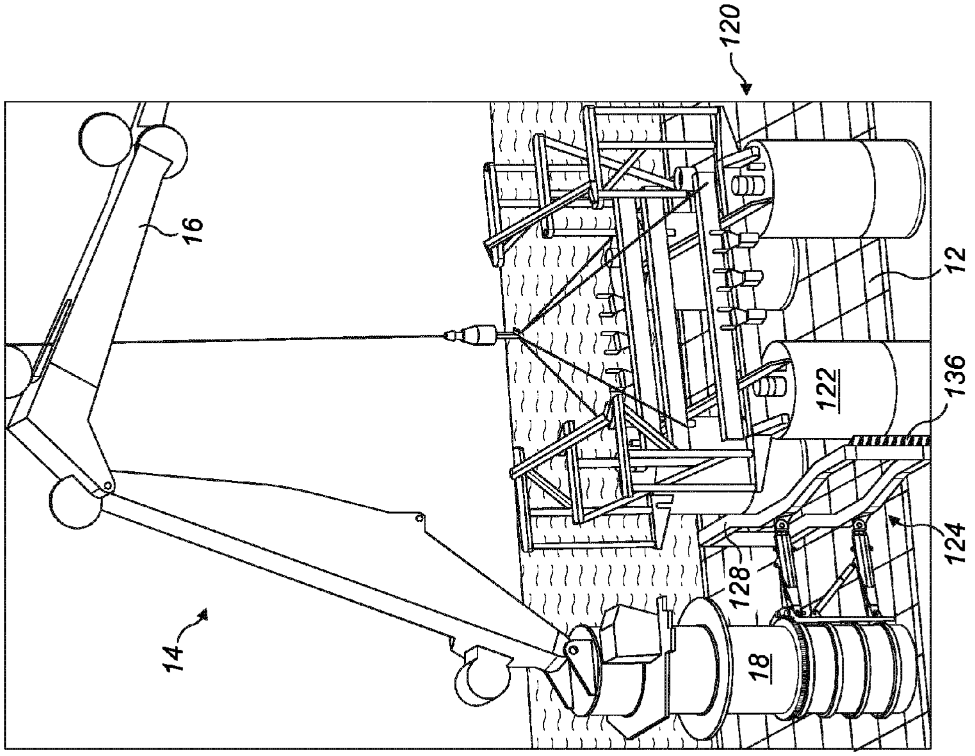
Figure 19:
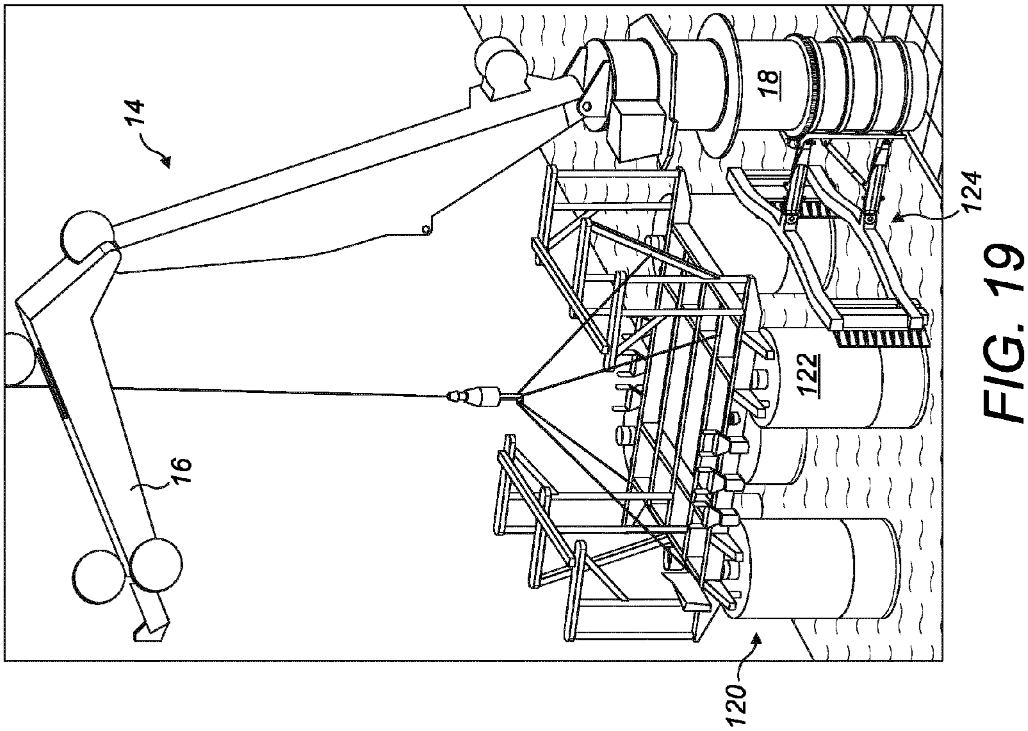

FIG. 16 shows the boom 16 having lifted the load 120 slightly above the deck 12. While the load 120 remains above the deck 12, the pads 136 of the handling frame 128 bear against the suction piles 122 to one side of the load 120. This engagement resists horizontal movement of the load 120 with respect to the boom 16.

Figure 17:
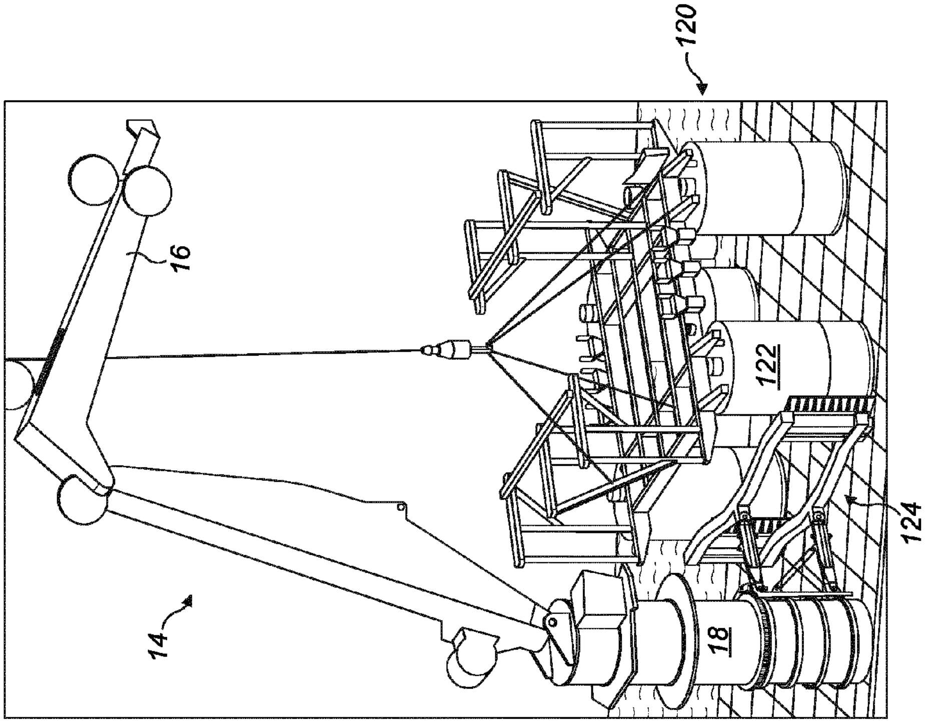
Figure 18:
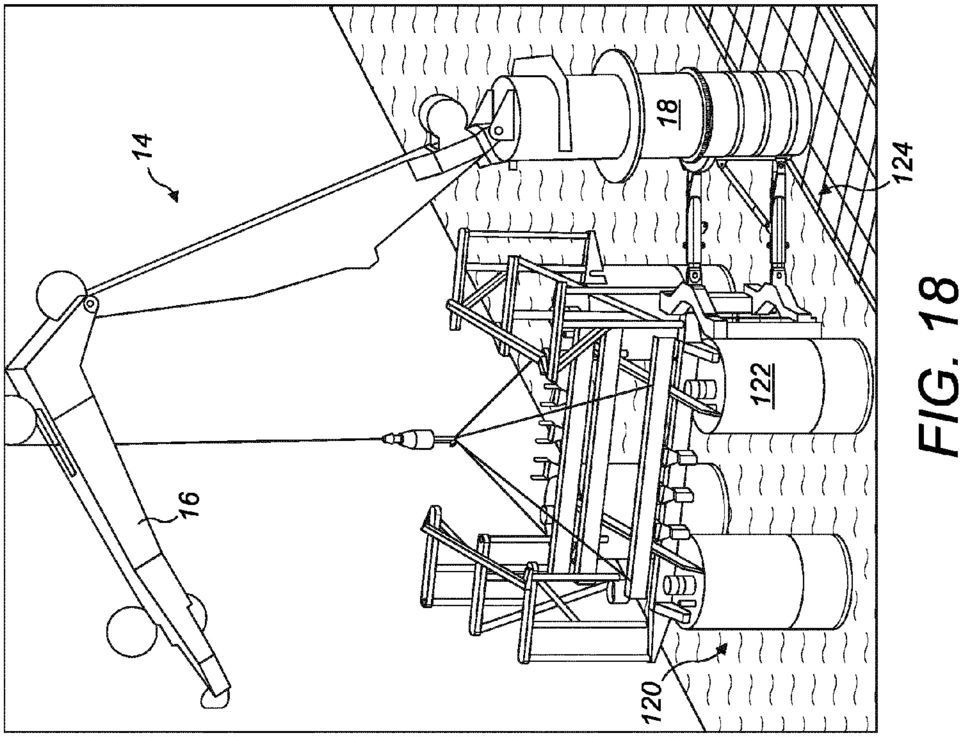

Next, the boom 16 of the crane 14 slews through either of the intermediate positions shown in FIG. 17 or FIG. 18 with respect to the stationary pedestal 18 of the crane 14. The guide apparatus 124 slews around the pedestal 18 in unison with the boom 16, hence remaining aligned with the load 120 to maintain control of its horizontal position with respect to the boom 16. Finally the boom 16 projects orthogonally from the side of the vessel 10 as the load 120 reaches the fully outboard position shown in FIG. 19. The load 120 is now ready to be lowered into the sea, as will be explained with reference to the final sequence of views in FIGS. 20 to 23.

Referring finally then to the sequence of views in FIGS. 20 to 23, these show how the guide apparatus 124 reconfigures to continue guiding the load 120 as the load 120 is lowered into the sea while the boom 16 of the crane 14 remains in the fully outboard position.

Figure 20:
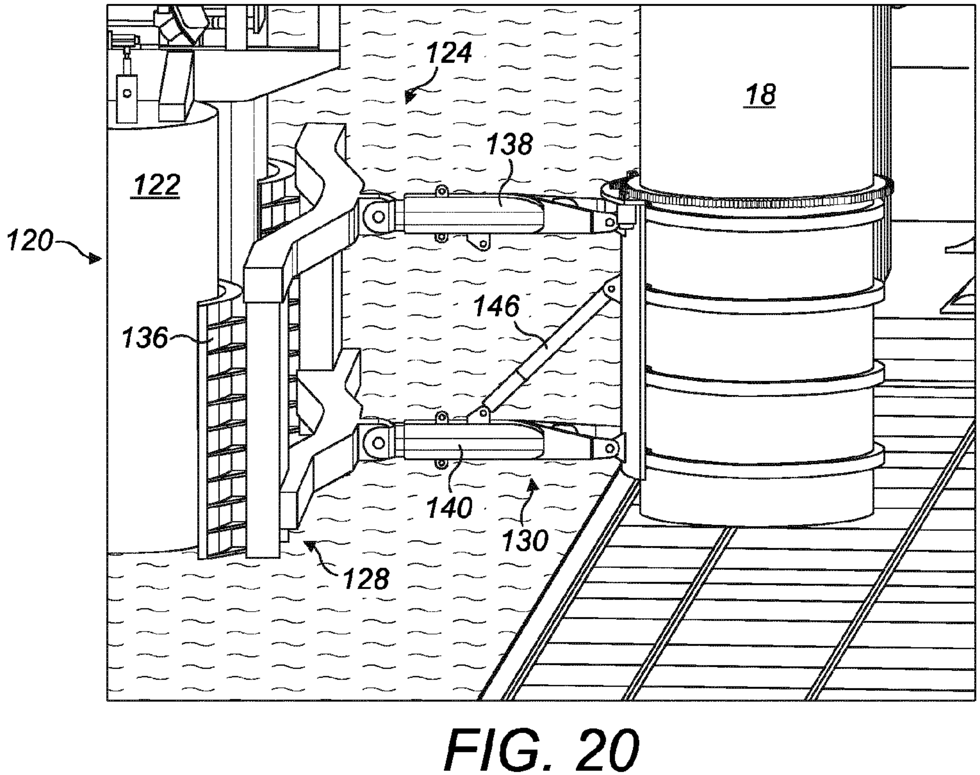
Figure 21:
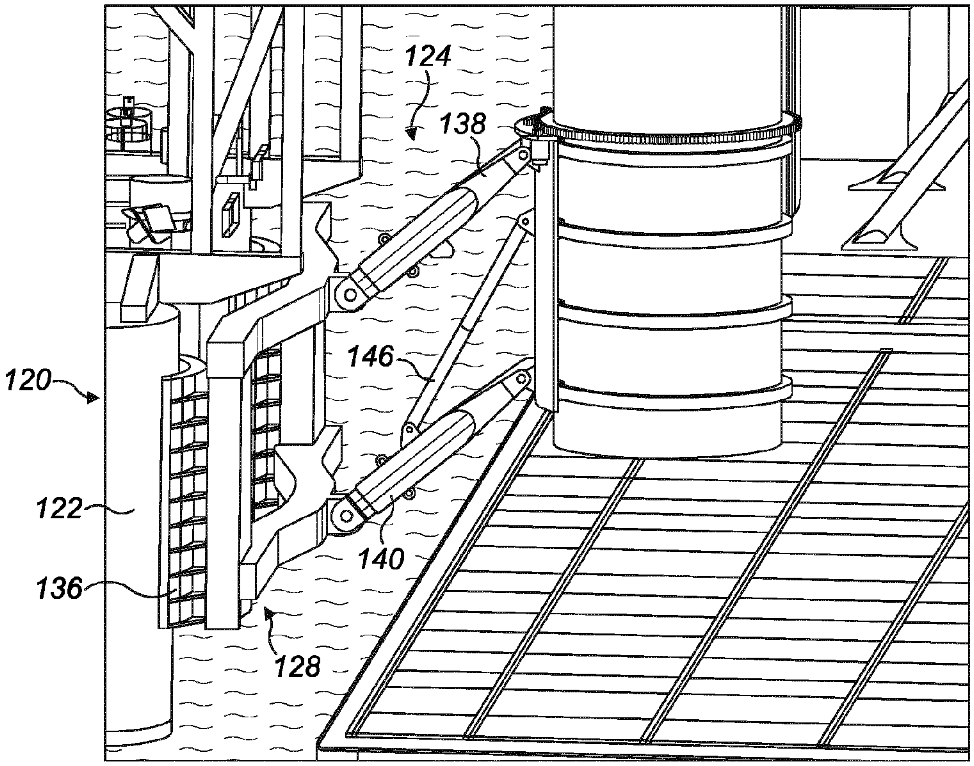

FIG. 20 shows the guide apparatus 124 with the handling frame 128 in the raised position to match the still-raised position of the load 120. As the crane 14 starts to lower the load 120 toward the sea as shown in FIG. 21, the arms 138, 140 of the parallelogram linkage 130 swing down slowly as the hydraulic cylinder 146 extends, to lower the handling frame 128 with the load 120. The handling frame 128 tracks downward movement of the load 120 as far as the linkage 130 will allow but as FIG. 21 shows, the load 120 can continue thereafter to slide downwardly relative to the pads 136 carried by the handling frame 128. In this respect, it will be noted that the suction piles 122 of the load 120 remain engaged with the concave pads 136 to resist horizontal movement of the load 120, even as the load 120 moves vertically with respect to the pads 136.

Optionally, although not shown in FIG. 21, the arms 138, 140 can extend as they swing down to maintain the same radial spacing between the handling frame 128 and the pivot axis of the crane 14, to keep the pads 136 of the handling frame 128 firmly against the load 120. If not, the boom 16 of the crane 14 can instead be pulled back slightly as the load 120 is lowered, to reduce the radial spacing between the pivot axis and the load 120 and hence to keep the load 120 firmly against the pads 136 of the handling frame 128.

Figure 22:
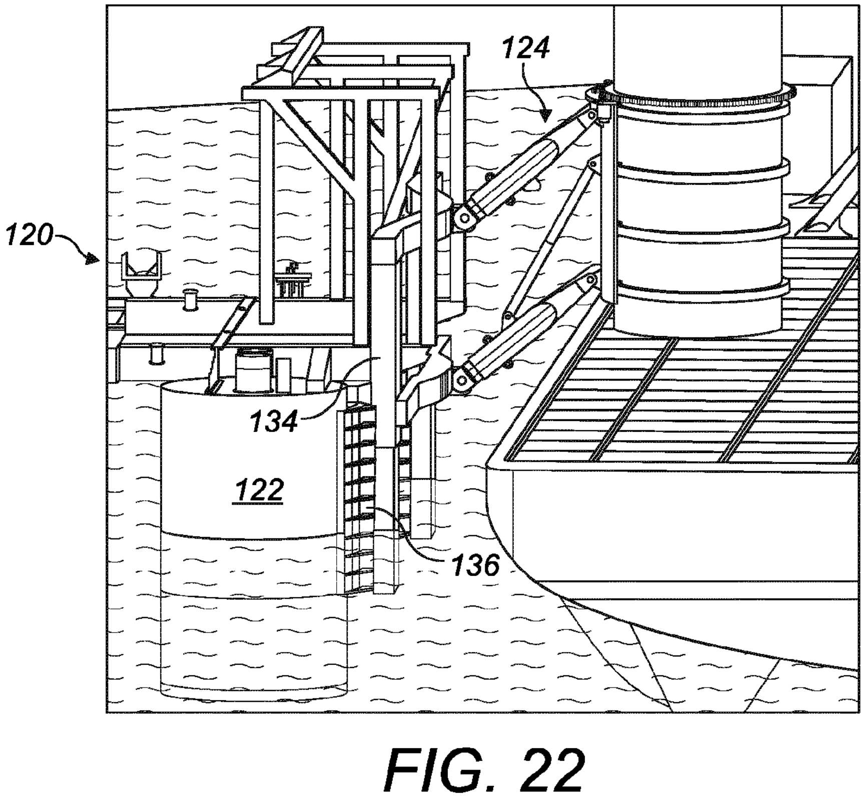

Eventually, as will be apparent from FIG. 21, the load 120 cannot slide further relative to the pads 136 without starting to disengage from the pads 136. FIG. 22 shows that the pads 136 may then be released or driven to move downwardly along the uprights 134 of the handling frame 128 as the load 120 continues to be lowered into the water. As the pads 136 move from the raised position shown in FIG. 21 into the lowered position shown in FIG. 22, they track downward movement of the load 120. It will be noted that the pads 136 may be at least partially submerged when in their lowered position to provide continued guidance to the load 120 all the way down into the water.

Figure 23:
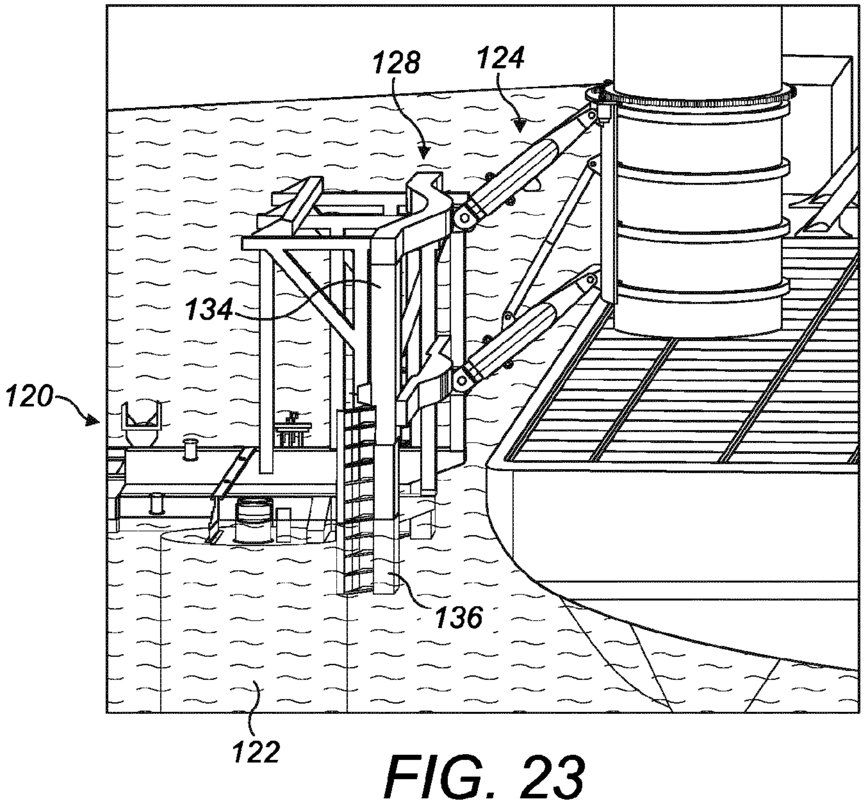

Even when the pads 136 have reached their lowest position relative to the handling frame 128 as shown in FIG. 22, the load 120 can continue to be guided by the pads 136 as it is lowered further into the sea. In this respect, FIG. 23 shows how the load may again slide downwardly relative to the pads 136 while the suction piles 122 of the load 120 remain partially engaged with the pads 136 to resist horizontal movement of the load 120 as the load 120 slides vertically with respect to the pads 136.

Eventually the load 120 will slide fully past the pads 136 of the handling frame 128. The load 120 is then lowered quickly through the remainder of the splash zone, the guide apparatus 124 having completed its job. The pads 136 are then raised relative to the handling frame 128 and the handling frame 128 is raised by the linkage 130 back to the raised position, whereupon the guide apparatus 124 can be turned back around the pedestal 18 of the crane 14 to track inboard slewing of the boom 16 after the load 120 has been landed.

It will be appreciated that the guide apparatus of the invention continues to guide a load even as the load submerges in the sea, whereupon wind gusts and vessel motion cease to have a significant effect on horizontal movement of the load. That guidance continues as the load begins to traverse the splash zone as the load remains secured to the guide apparatus beneath the surface, hence resisting uncontrolled movements of the load in the splash zone. Consequently, by virtue of the invention, the weather limits for the overboarding and lowering operation are higher and the operation is safer.

Some possible variations have been described above; other variations are possible without departing from the inventive concept. For example, a handling frame may be arranged to suit a particular shape and size of load but a crane will need to handle many different loads. Consequently, a handling frame can be removed and swapped for another handling frame tailored for another type of load.

It would of course be possible to move the guide apparatus around the pedestal of a crane by a control system separate from that of the crane, which system could be controlled manually. In any event, there should be provision for manual override, for example for smaller loads where the boom needs to slew but there is no need for the guide apparatus to move with the boom to guide the load.

If the sequences shown in FIGS. 6 to 8 and 16 to 19 are reversed, it will be appreciated that a crane and the guide apparatus of the invention can also work together to lift a load onto the deck of a vessel from a position outboard of the vessel, for example from a supply barge or from a quay.

The invention claimed is:

1. A method of overboarding and lowering a load from a vessel in an offshore environment using a vessel-mounted slewing crane, wherein the method comprises placing first and second crane-mounted guide members between respective spaced locations on the load and a supporting structure of the crane upstanding above a deck of the vessel and, while the guide members act in compression between the load and the supporting structure of the crane to restrain horizontal movement of the load toward a slewing axis of the crane:

using the crane to lift the load above the deck;

slewing a boom of the crane to move the load from above the deck into an outboard over-water position while moving the guide members with the boom;

extending the guide members differentially to control orientation of the load relative to the boom of the crane; and using the crane to lower the load from the outboard position into the water while lowering the guide members with the load.

2. The method of claim 1, comprising lowering the guide members to a level below the deck while lowering the load from the outboard position into the water.

3. The method of claim 1, wherein each guide member also acts in tension between the load and the crane.

4. The method of claim 1, comprising extending the guide members to accommodate movement of the load away from the slewing axis of the crane.

5. The method of claim 1, comprising extending the guide members while lowering the load from the outboard position into the water.

6. The method of claim 1, comprising placing the guide members beside the load as a barrier to restrain horizontal movement of the load.

7. The method of claim 6, wherein each guide member engages a complementary formation of the load to resist relative horizontal movement between the guide member and the load.

8. The method of claim 1, comprising lowering the guide members into the water with the load.

9. The method of claim 1, wherein the load moves downwardly relative to the guide members while the guide members continue to restrain horizontal movement of the load toward the slewing axis of the crane.

10. The method of claim 1, wherein each guide member is moved in synchronisation with the boom of the crane.

11. The method of claim 1, wherein each guide member moves relative to the crane to continue restraining horizontal movement of the load while the boom of the crane slews during lifting or lowering of the load.

12. A crane operating in accordance with the method of claim 1.

13. A vessel operating in accordance with the method of claim 1.

14. A method of overboarding and lowering a load from a vessel in an offshore environment using a vessel-mounted slewing crane, wherein the method comprises placing at least one crane-mounted guide member between the load and a fixed pedestal or mast of the crane upstanding above a deck of the vessel and, while the guide member acts in compression to restrain horizontal movement of the load toward a slewing axis of the crane:

using the crane to lift the load above the deck;

slewing a boom of the crane to move the load from above the deck into an outboard over-water position while moving the guide member around and relative to the pedestal or mast, with the boom; and using the crane to lower the load from the outboard position into the water while lowering the guide member with the load.

15. A crane operating in accordance with the method of claim 14.

16. A vessel operating in accordance with the method of claim 14.

17. A crane-mountable guide apparatus for assisting a vessel-mounted slewing crane to overboard and lower a load from a vessel into water, the apparatus comprising first and second guide members that can be positioned between the load and a supporting structure of the crane upstanding above a deck of the vessel, wherein the guide members are capable of acting in compression between the load and the supporting structure of the crane to restrain horizontal movement of the load toward a slewing axis of the crane, and are movably connected to a mount to move with the load relative to the mount as the crane lifts the load above a deck of the vessel, as a boom of the crane slews to move the load from above the deck into an outboard over-water position and as the crane lowers the load from the outboard position into the water; and wherein the first and second guide members are differentially extendable in length from the mount toward the load to control orientation of the load relative to the boom of the crane.

18. The apparatus of claim 17, wherein the guide members are also capable of acting in tension between the load and the crane.

19. The apparatus of claim 17, wherein each guide member comprises an arm that is pivotable with respect to the mount.

20. The apparatus of claim 17, wherein each guide member is movable to continue to restrain horizontal movement of the load if the boom of the crane is slewed during lifting or lowering of the load.

21. A crane fitted with the guide apparatus of claim 17.

22. A vessel fitted with a crane and the guide apparatus of claim 17.

23. A method of adapting a vessel-mounted crane to assist with overboarding and lowering a load from a vessel into water, the method comprising attaching a guide apparatus as defined in claim 17 to a pedestal, mast or other upstanding supporting structure of the crane via the mount of that apparatus.

24. A crane-mountable guide apparatus for assisting a vessel-mounted slewing crane to overboard and lower a load from a vessel into water, the apparatus comprising at least one guide member that can be positioned between the load and a fixed pedestal or mast of the crane upstanding above a deck of the vessel, wherein:

the guide member is capable of acting in compression to restrain horizontal movement of the load toward a slewing axis of the crane and is movably connected to a mount to move with the load relative to the mount as the crane lifts the load above a deck of the vessel, as a boom of the crane slews to move the load from above the deck into an outboard over-water position and as the crane lowers the load from the outboard position into the water; and the mount is arranged to embrace the pedestal or mast and is arranged such that the guide member can turn around the pedestal or mast.

25. The apparatus of claim 24, wherein the mount is arranged to drive the guide member around the pedestal or mast.

26. The apparatus of claim 24, wherein the guide members comprise a frame that is movably connected to the mount and that can be lowered relative to the mount.

27. The apparatus of claim 26, wherein the frame is interchangeably removable from the mount.

28. The apparatus of claim 26, wherein the frame is movably connected to the mount via a linkage that comprises at least one arm that swings downwardly to lower the frame with the load.

29. The apparatus of claim 28, wherein the arm of the linkage is of variable length.

30. The apparatus of claim 24, wherein the guide member comprises an element that is movable downwardly with the load with respect to the frame.

31. The apparatus of claim 24, wherein the guide member is shaped to engage a complementary formation of the load.

32. The apparatus of claim 31, wherein the guide member is shaped to define a vertically-extending channel for guiding downward movement of the load with respect to the guide member.

33. The apparatus of claim 24, wherein the or each guide member comprises an arm that is pivotable with respect to the mount.

34. The apparatus of claim 24, wherein the or each guide member is movable to continue to restrain horizontal movement of the load if the boom of the crane is slewed during lifting or lowering of the load.

35. A crane fitted with the guide apparatus of claim 24.

36. A vessel fitted with a crane and the guide apparatus of claim 24.

37. A method of adapting a vessel-mounted crane to assist with overboarding and lowering a load from a vessel into water, the method comprising attaching a guide apparatus as defined in claim 24 to a pedestal, mast or other upstanding supporting structure of the crane via the mount of that apparatus.

* * * * *